US011950351B2

(12) United States Patent
Yokoyama

(10) Patent No.: US 11,950,351 B2
(45) Date of Patent: Apr. 2, 2024

(54) ELECTROMAGNETIC FIELD CONTROL MEMBER

(71) Applicant: KYOCERA Corporation, Kyoto (JP)

(72) Inventor: Atsushi Yokoyama, Shiga (JP)

(73) Assignee: KYOCERA CORPORATION, Kyoto (JP)

( * ) Notice: Subject to any disclaimer, the term of this patent is extended or adjusted under 35 U.S.C. 154(b) by 221 days.

(21) Appl. No.: 17/639,192

(22) PCT Filed: Aug. 28, 2020

(86) PCT No.: PCT/JP2020/032739

§ 371 (c)(1),
(2) Date: Feb. 28, 2022

(87) PCT Pub. No.: WO2021/040017

PCT Pub. Date: Mar. 4, 2021

(65) Prior Publication Data

US 2022/0330413 A1 Oct. 13, 2022

(30) Foreign Application Priority Data

Aug. 30, 2019 (JP) ................................ 2019-158062

(51) Int. Cl.
*H05H 7/04* (2006.01)
*G21K 1/093* (2006.01)
*H05H 13/00* (2006.01)

(52) U.S. Cl.
CPC ............... *H05H 7/04* (2013.01); *G21K 1/093* (2013.01); *H05H 13/00* (2013.01)

(58) Field of Classification Search
CPC .... H05H 7/04; H05H 13/00; H05H 2007/045; G21K 1/093
See application file for complete search history.

(56) References Cited

U.S. PATENT DOCUMENTS

2005/0045821 A1* 3/2005 Noji .................. G01N 23/2204 250/311
2020/0105433 A1 4/2020 Iwamoto et al.

FOREIGN PATENT DOCUMENTS

CN 101523665 A * 9/2009 ............... H01Q 1/40
CN 103376431 A * 10/2013 ......... G01R 33/3685
(Continued)

OTHER PUBLICATIONS

Mitsuda et al., Beam Performance Test of Ceramics Chamber With Integrated Pulsed Magnet in Beam Transport-Dump for KEK PF-Ring. Proceedings of the 16th Annual Meeting of Particle Accelerator Society of Japan, Jul. 31-Aug. 3, 2019, 5 pgs.

*Primary Examiner* — Abdullah A Riyami
*Assistant Examiner* — Syed M Kaiser
(74) *Attorney, Agent, or Firm* — Procopio, Cory, Hargreaves & Savitch LLP

(57) ABSTRACT

Provided is an electromagnetic field control member, the member including an insulating member made of a ceramic having a tubular shape and including a plurality of through holes extending in an axial direction; a conductive member that is made of a metal, seals off each of the through holes, and leaves an opening portion in the through hole, the opening portion opening to an outer periphery of the insulating member; and a power feed terminal connected to the conductive member. The through holes each include inner wall surfaces further including inclined surfaces for which a width between inner walls facing each other increases from an inner periphery of the insulating member to an outer periphery of the insulating member: and vertical surfaces that are located on an inner peripheral side of the insulating member and for which a width between inner walls facing each other is constant.

9 Claims, 4 Drawing Sheets

(56) References Cited

FOREIGN PATENT DOCUMENTS

| | | | | |
|---|---|---|---|---|
| EP | 4025017 | A1 | 7/2022 | |
| WO | 2018174298 | A1 | 9/2018 | |
| WO | WO-2018174298 | A1 * | 9/2018 | ............ G21K 1/093 |

* cited by examiner

ELECTROMAGNETIC FIELD CONTROL MEMBER

TECHNICAL FIELD

The present disclosure relates to an electromagnetic field control member, the member being used in accelerators or the like for accelerating charged particles such as electrons and heavy particles.

BACKGROUND ART

In the related art, there has been a demand for high speed, high magnetic field power, and high repeatability with regard to an electromagnetic field control member that is used in accelerators for accelerating charged particles such as electrons and heavy particles. For such improvements in performance, Ceramics Chamber with integrated Pulsed-Magnet (hereinafter referred to as CCiPM) has been proposed by Chikaori Mitsuda et al. of the High Energy Accelerator Research Organization (Non Patent Document 1).

CCiPM includes: an insulating member having a cylindrical shape, the insulating member being made of a ceramic; a through hole formed along an axial direction of the insulating member, the through hole extending through a thickness direction of the insulating member; and a conductive member having a substrate shape, the conductive member being embedded in the through hole. The conductive member serves as a part of a partition wall that separates an inside and an outside of the insulating member, and ensures airtightness inside the insulating member.

To maintain the airtightness of a space located inside the insulating member over an extended period of time, the present applicant has proposed an electromagnetic field control member that includes an insulating member made of a ceramic having a tubular shape, the insulating member including a plurality of through holes along an axial direction; a conductive member made of a metal, the conductive member sealing off each of the through holes and leaving an opening portion in the through hole, the opening portion opening to an outer periphery of the insulating member; and a power feed terminal connected to the conductive member. The power feed terminal is separated from inner walls of the insulating member, the inner walls forming the through hole, include a first end and a second end in an axial direction, and at least one of the first end or the second end is further separated from the inner walls than a central portion of the power feed terminal (Patent Document 1). According to Patent Document 1, a width between the inner walls gradually increases from an inner periphery to an outer periphery of the insulating member.

CITATION LIST

Patent Literature

Patent Document 1: International Publication WO 2018/174298

Non Patent Literature

Non Patent Document 1: Chikaori Mitsuda et al., "Beam performance test of Ceramics Chamber with integrated Pulsed Magnet in beam transport-dump line for KEK PF-ring"

SUMMARY OF INVENTION

An electromagnetic field control member according to an embodiment of the present disclosure includes an insulating member made of a ceramic having a tubular shape, the insulating member including a plurality of through holes extending in an axial direction; a conductive member made of a metal, the conductive member sealing off each of the through holes and leaving an opening portion in the through hole, the opening portion opening to an outer periphery of the insulating member; and a power feed terminal connected to the conductive member. The through holes each include inner wall surfaces further including inclined surfaces for which a width between inner walls facing each other gradually increases from an inner periphery of the insulating member having the tubular shape toward an outer periphery of the same, and vertical surfaces located on an inner peripheral side of the insulating member and for which a width between inner walls facing each other is constant.

DESCRIPTION OF EMBODIMENTS

An electromagnetic field control member according to an embodiment of the present disclosure will be described below with reference to the drawings. In the present example, an example of a ceramic chamber with an integrated pulsed magnet (CCiPM) is described as an embodiment of the electromagnetic field control member.

Figure 1A:
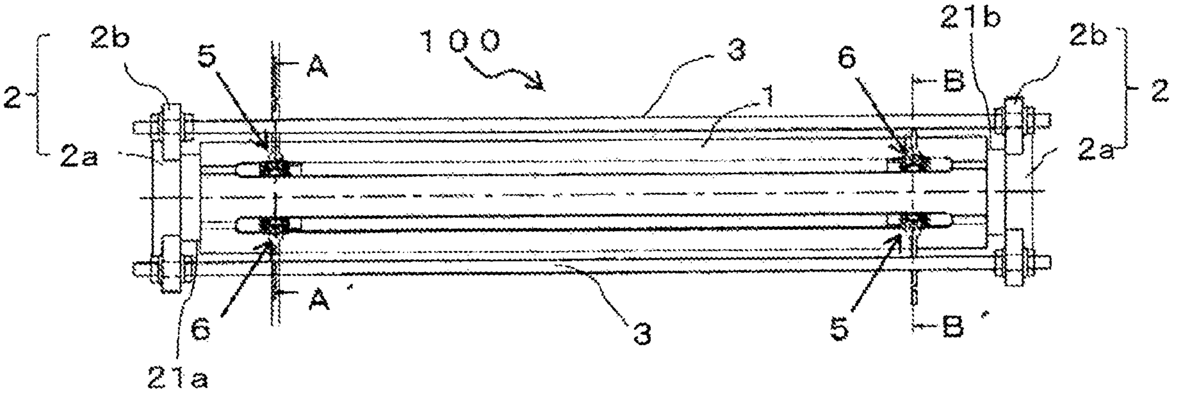
FIG. 1A is a front view illustrating an electromagnetic field control member according to an embodiment of the present disclosure.

FIG. 1A illustrates an electromagnetic field control member 100 according to an embodiment of the present disclosure, which is a CCiPM. An electromagnetic field control member 100 illustrated in FIG. 1 includes an insulating member 1 and flanges 2, 2 respectively located at two ends of the insulating member 1.

Figure 6:
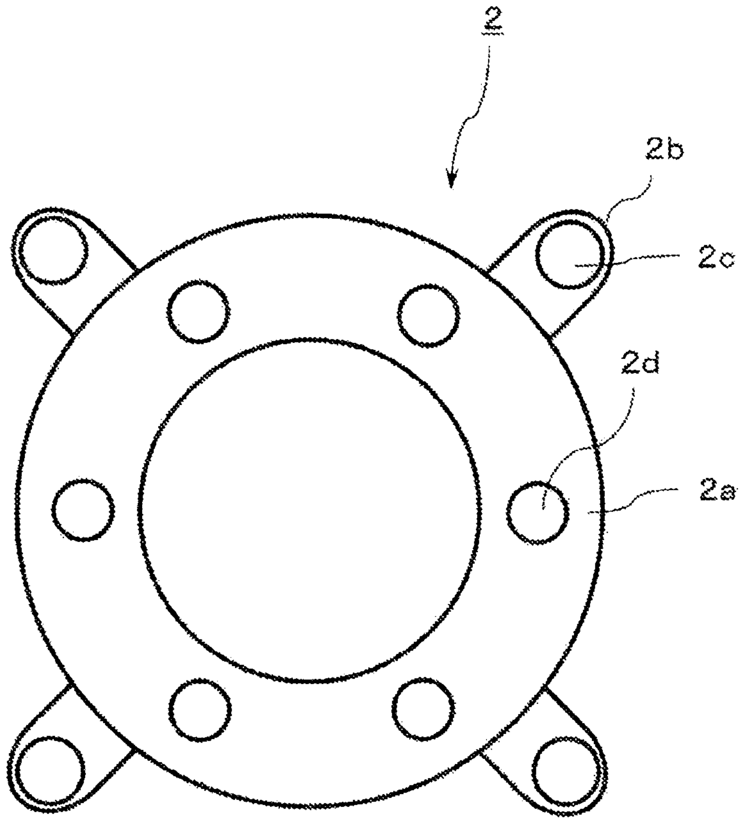
FIG. 6 is a front view of a flange illustrated in FIG. 1.

Note that the flanges 2, 2 are each a member that connects to a vacuum pump (not illustrated) for vacuuming a space 14 surrounded by an inner periphery of the insulating member 1. As illustrated in FIG. 6, the flange 2 includes an annular base portion 2*a* and a plurality of extending portions 2*b* extending radially from an outer peripheral surface of the annular base portion 2*a*. The extending portions 2*b* are bonded to the outer peripheral surface of the annular base portion 2*a* by TIG welding, which is a type of arc welding method, and, in the example illustrated in FIG. 6, four extending portions 2*b* are provided at equal intervals along a circumferential direction. Each of the extending portions 2*b* includes an insertion hole 2*c* including a female screw portion along a thickness direction. A shaft 3 including a male screw portion is inserted into the insertion hole 2*c*, and fastened by nuts (not illustrated) from both sides in the thickness direction of the extending portion 2*b*. Thus, the flanges 2, 2 respectively mounted on the two ends of the insulating member 1 are connected to each other.

The annular base portion 2*a* includes mounting holes 2*d* at equal intervals along the circumferential direction for connecting with a flange on a vacuum pump side (not illustrated), and a fastening member such as a bolt is inserted into each of the mounting holes 2*d*. Thus, the flanges are fastened to each other.

The flange 2, the shaft 3, and the nuts are preferably made of an austenitic stainless steel. An austenitic stainless steel is non-magnetic, and thus effects of magnetism caused by the flanges 2 on the electromagnetic field control member 100 can be reduced. In particular, the flanges 2 are preferably made of SUS304L and SUS304L, respectively. SUS304L and SUS304L are stainless steels that are not prone to grain boundary corrosion. Thus, in a configuration in which the extending portion 2*b* is TIG welded to the outer peripheral surface of the annular base portion 2*a*, and when the annular base portion 2*a* and the extending portion 2*b* are at a high temperature, grain boundary corrosion is unlikely to occur, and the airtightness of the annular base portion 2*a* is unlikely to be impaired. TIG welding of the extending portion 2*b* to the outer peripheral surface of the annular base portion 2*a* may be intermittent welding or continuous welding along the thickness direction.

As illustrated in FIG. 1A, an inner peripheral surface of the flange 2 on the left side and an end surface on the left side of the insulating member 1 are bonded by a sleeve 21*a*. Similarly, an inner peripheral surface of the flange 2 on the right side and an end surface on the right side of the insulating member 1 are bonded by a sleeve 21*b*.

The sleeves 21*a*, 21*b* include a fernico alloy, an Fe—Ni alloy, an Fe—Ni—Cr—Ti—Al alloy, a Fe—Cr—Al alloy, or a Fe—Co—Cr alloy, and a cross section thereof including a center axis of the insulating member 1 is an annular body having an L shape.

An outer peripheral surface of each of the sleeves 21*a*, 21*b*, the outer peripheral surface facing the flange 2, includes a metal layer (not illustrated) including nickel as a main constituent. Both end surfaces of the insulating member 1 include molybdenum as a main constituent and a metallization layer including manganese (not illustrated) as well.

The sleeves 21*a* and 21*b* bond the insulating member 1 and the flanges 2 by joining the end surface including the metallization layer of the insulating member 1 and the inner peripheral surface of the flanges 2 by a brazing material.

Figure 1B:
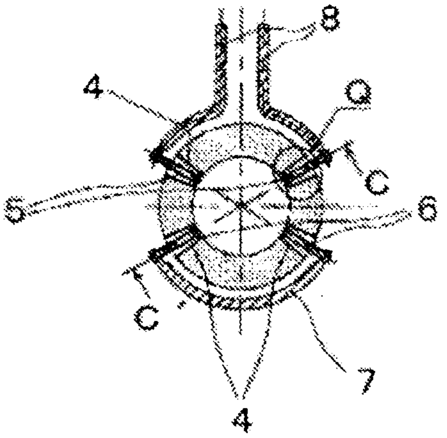
FIG. 1B is a cross-sectional view taken along line A-A' in FIG. 1A.
Figure 1C:
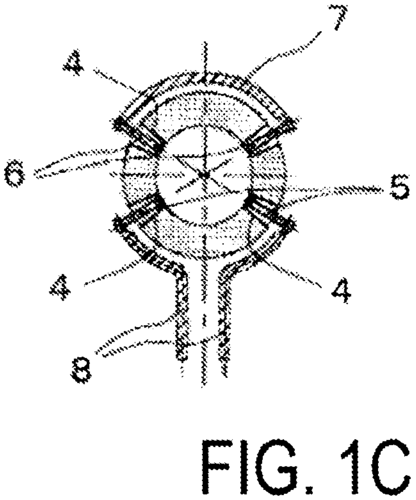
FIG. 1C is a cross-sectional view taken along line B-B' in FIG. 1A.

As illustrated in FIG. 1B, which is a cross-sectional view taken along line A-A' in FIG. 1A, and as illustrated in FIG. 1C, which is a cross-sectional view taken along line B-B' in FIG. 1B, the insulating member 1 is made of a ceramic having a tubular shape. The insulating member 1 includes a plurality of through holes 4 extending in an axial direction. Here, "axial direction" refers to a direction along a center axis of the insulating member 1 made of the ceramic having the tubular shape.

The insulating member 1 includes a plurality of first power feed terminals 5 and a plurality of second power feed terminals 6 on two end surfaces thereof, respectively. The first power feed terminals 5 are terminals for feeding electric power, and as illustrated in FIG. 1B, are connected to an external device via a line 8. Also, two adjacent second power feed terminals 6 are electrically connected by a line 7.

Figure 2A:
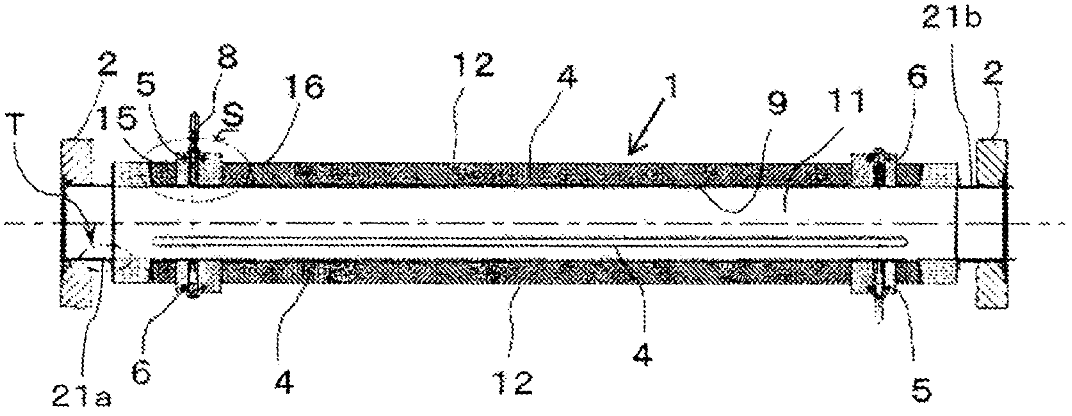
FIG. 2A is a cross-sectional view taken along line C-C' in FIG. 1B.
Figure 3:
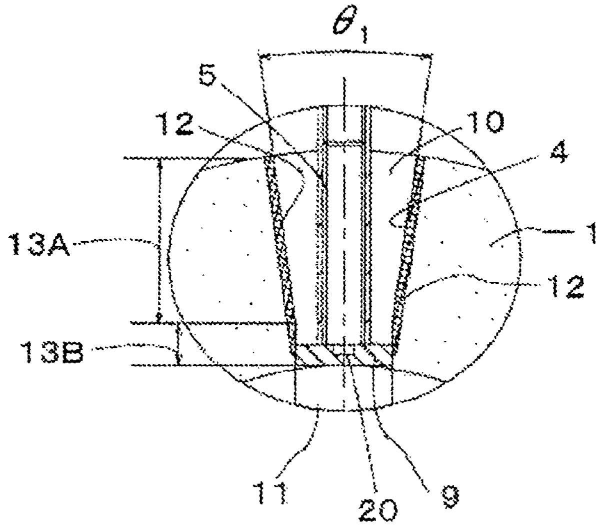
FIG. 3 is an enlarged view of a region Q in FIG. 1B.

As illustrated in FIG. 2A, which is a cross-sectional view taken along C-C' in FIG. 1B, and in FIG. 3, which is an enlarged view of the region Q in FIG. 1B, a conductive member 9 is disposed in each of the through holes 4. The conductive member 9 is made of copper, for example, an oxygen-free copper (e.g., alloy number C1020 as specified in JIS H 3100:2012 or alloy number C1011 as specified in JIS H 3510:2012), and extends together with the through hole 4 in the axial direction. As illustrated in FIG. 3, the conductive member 9 seals off the through hole 4 to form an opening portion 10 that opens to an outer periphery of the insulating member 1. The conductive member 9 sealing off the through hole 4 ensures the airtightness of the space 11 surrounded by the inner periphery of the insulating member 1.

Here, both end surfaces of the conductive member 9 in the axial direction are preferably curved surfaces that extend in the axial direction in a plan view. In a configuration in which both end surfaces of the conductive member 9 in the axial direction have such a shape, thermal stress remaining near both end surfaces of the conductive member 9 in the axial direction can be reduced even when heating and cooling are repeated.

The conductive member 9 ensures a conductive region for driving an induced current excited so as to accelerate or deflect electrons, heavy particles, and the like that move within the space 11. The conductive member 9 may include a flat surface on an inner peripheral side of the insulating member 1, but, as illustrated in FIG. 3, is preferably curved along the inner periphery of the insulating member 11.

The first power feed terminals 5 and the second power feed terminals 6 are each connected to the conductive member 9 in the through hole 4 of the insulating member 1, so as to provide electrical power from the external device to the conductive member 9 at or near both ends of the conductive member 9 disposed along the axial direction.

Further, as illustrated in FIGS. 2A and 3, a metallization layer 12 is formed on inner walls of the insulating member 1, the inner walls facing each other across the through hole 4. The metallization layer 12 is formed from one end surface to the other end surface, the end surfaces forming the through hole 4 along the axial direction.

The metallization layer 12 includes, for example, molybdenum as a main constituent and manganese as well. Furthermore, a surface of the metallization layer 12 may include a metal layer including nickel as a main constituent. Note that a plating layer may be formed instead of the metallization layer 12.

The thickness of the metallization layer 12 is, for example, 15 μm or more and 45 μm or less. The thickness of the metal layer is, for example, 0.1 μm or more and 2 μm or less.

The conductive member 9 is bonded to the insulating member 1 by a brazing material such as silver solder (e.g., BAg-8, BAg-8A, BAg-8B) via the metallization layer 12 or the metal layer.

As illustrated in FIG. 3, inner wall surfaces of the through hole 4, the inner wall surfaces including the metallization layer 12, include: inclined surfaces 13A for which a width (gap) between inner walls facing each other gradually increases from an inner periphery of the insulating member 1 to an outer periphery of the same; and vertical surfaces 13B located on an inner peripheral side of the insulating member 1 and for which a width between inner walls facing each other is constant. The inclined surfaces 13A and the vertical surfaces 13B are preferably provided throughout the entire length of the through hole 4.

In a configuration in which the inner wall surfaces of the through hole 4 include the inclined surfaces 13A, stress remaining in the insulating member 1 does not overly increase even when heating and cooling are repeated, and thus cracking in the insulating member 1 can be suppressed over an extended period of time. Furthermore, in the inclined surfaces 13A, an angle $\theta_1$ (see FIG. 3) formed by the inner walls facing each other may be 12° or more and 20° or less. When the angle $\theta_1$ is within this range, the mechanical strength of the insulating member 1 can be maintained, and cracking in the insulating member 1 can be further suppressed. Note that the angle $\theta_1$ formed by the inner walls opposed to each other may be measured in a cross section orthogonal to the axial direction.

On the other hand, the vertical surfaces 13B are formed on the inner peripheral side of the insulating member 1, thus preventing a gap from forming between a side surface of the conductive member 9 and the metallization layer 12 formed on the inner wall surfaces due to variation in the angle of the inclined surfaces 13A, and thus the airtightness between the conductive member 9 and the insulating member 1 increases, and the airtightness throughout the electromagnetic field control member 100 improves.

The airtightness of the electromagnetic field control member 100 can be, for example, $1.3\times10^{-11}$ Pa·m$^3$/s or less as measured by a helium leak detector.

Figure 4:
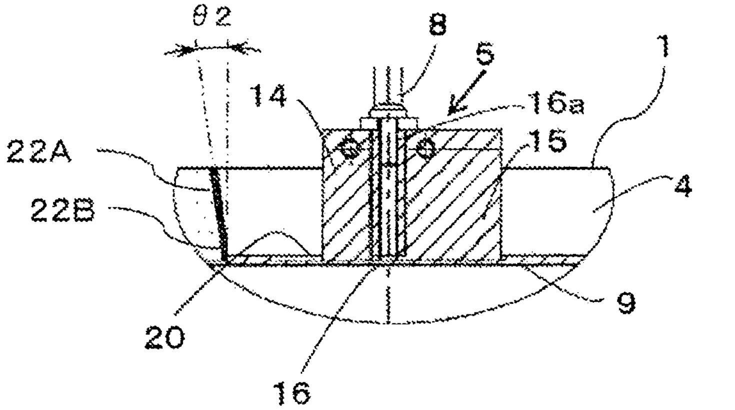
FIG. 4 is an enlarged view of a region S in FIG. 2A.

At least one of both of the end surfaces forming the through hole 4 may include, in the cross-sectional view illustrated in FIG. 4, second inclined surfaces 22A widening toward both ends in the axial direction and second vertical surfaces 22B orthogonal to the center axis. An angle $\theta_2$ of the second inclined surfaces 22A with respect to the second vertical surfaces 22B is, for example, 4° or more and 12° or less.

As illustrated in FIG. 3, the volume between the inclined surfaces 13A facing each other is preferably larger than a volume between the vertical surfaces 13B facing each other. When the volume between the inclined surfaces 13A is large, the electromagnetic field control member 100 maintains airtightness, and the volume throughout the opening portion 10 increases, such that even if heating and cooling are repeated, thermal stress remaining in the insulating member 1 can be further reduced.

Note that the volume between the inclined surfaces 13A and the volume between the vertical surfaces 13B do not include the volumes of blades 14, 15 and a blade joining member 16 that form the first power feed terminal 5 and the second power feed terminal 6, nor do they include the volume of a space portion below a screw that is inserted into a hole 16*a* in a center portion of the blade joining member 16.

The inclined surfaces 13A and the vertical surfaces 13B are preferably continuous. That the inclined surfaces 13A and the vertical surfaces 13B are continuous refers to a state in which an edge portion of the inclined surfaces 13A on the side of the vertical surfaces 13B is in contact with an edge portion of the vertical surfaces 13B on the side of the inclined surfaces 13A, and a hole or micro notch may be present on a boundary line therebetween.

In a configuration in which the inclined surfaces 13A and the vertical surfaces 13B are continuous, the metallization layer 12 that is formed is less likely to include discontinuities, and the likelihood of particles breaking off from these surfaces and floating via the discontinuities can be reduced.

As illustrated in FIG. 3, the first power feed terminal 5 is inserted into the opening portion 10 along the radial direction of the insulating member 1, and includes a bottom portion that is in contact with the conductive member 9. In other words, the first power feed terminal 5 is provided upright on the conductive member 9. The first power feed terminal 5 includes a rear end portion that is connected to the line 8, and is made of, for example, an oxygen-free copper (e.g., alloy number C1020 as specified in JIS H 3100:2012 or alloy number C1011 as specified in JIS H 3510:2012).

Figure 5:
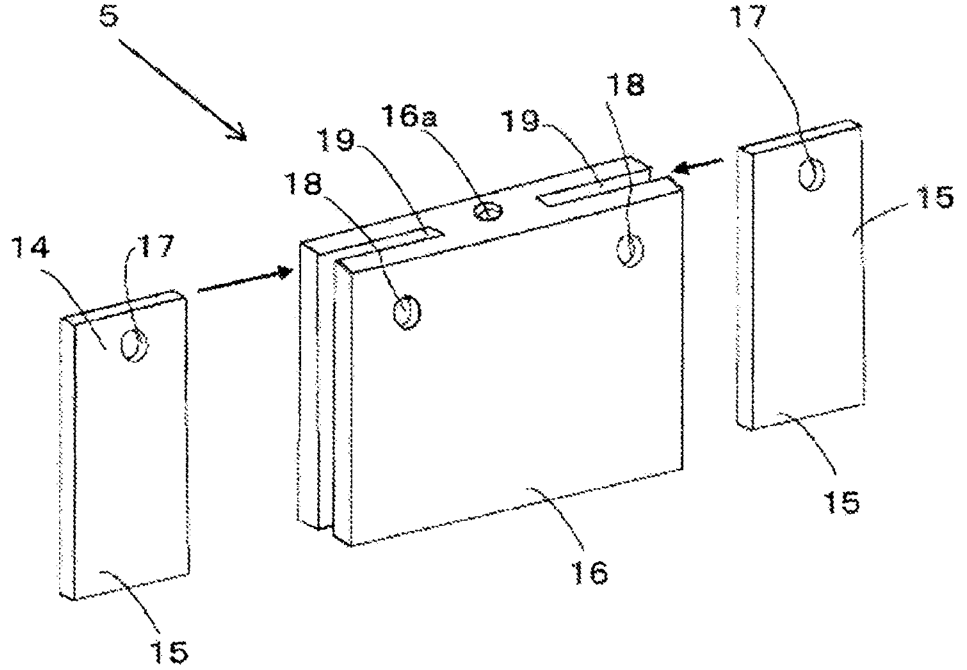
FIG. 5 is an exploded perspective view illustrating a blade and a blade joining member in FIG. 4.

As illustrated in FIGS. 3 and 4 (enlarged view of the region S in FIG. 2A), the first power feed terminal 5 includes two blades 14, 15 and the blade joining member 16. Specifically, as illustrated in FIG. 5, a portion of each of the two blades 14, 15 is inserted into a corresponding one of gaps 19, 19 on both sides of the blade joining member 16, which is H-shaped in a top surface view, screw insertion holes 17, 18 are made to communicate with each other, and the two blades 14, 15 and the blade joining member 16 are connected to each other by bolts (not illustrated) through the screw insertion holes 17, 18.

A tip of the line 8 is screwed into the hole 16*a* in a center portion of the blade joining member 16, and thus the first power feed terminal 5 and the line 8 are electrically connected to each other. On the other hand, as illustrated in FIGS. 3 and 4, a groove 20 is formed in a predetermined range along the axial direction of the insulating member 1 on a surface of the conductive member 9 on the side of the through hole 4. A lower end of each of the blades 14 and 15 is fitted into the groove 20, and the first power feed terminal 5 is provided upright on the conductive member 9.

Figure 2B:
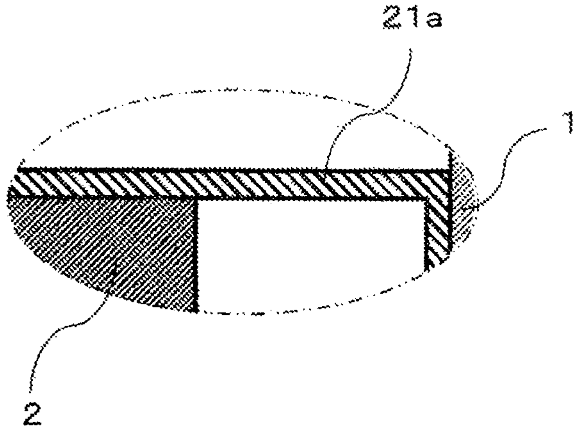
FIG. 2B is an enlarged view of a region T in FIG. 2A.

The second power feed terminal 6 illustrated in FIGS. 1 and 2 is identical to the first power feed terminal 5, and identical reference numerals will be assigned to identical members, and descriptions thereof will be omitted.

Here, both end surfaces of each of the grooves 20 positioned on the left and right in the axial direction are preferably curved surfaces that extend in the axial direction in a plan view. In a configuration in which both end surfaces of the groove 20 have such a shape, the thermal stress of the conductive member 9, the thermal stress remaining at or near both end surfaces of the groove 20 in the axial direction, can be reduced even when heating and cooling are repeated.

An outer peripheral side of each of end portions of the insulating member 1 may include a flat surface 1*a* on an extension line in the axial direction of the through hole 4.

Examples of the flat surface 1*a* include a D cut surface, which is a surface in which an outer peripheral surface on the extension line in the axial direction of the through hole 4 has been removed.

The flat surface 1*a* allows the first power feed terminal 5 and the second power feed terminal 6 each to be mounted on the conductive member 9 without the insulating member 1 rolling, thus facilitating the mounting process.

The insulating member 1 has electrical insulation and non-magnetic properties, and is made of, for example, a ceramic containing aluminum oxide as a main constituent, a ceramic containing zirconium oxide as a main constituent, the ceramic containing aluminum oxide as a main constituent being particularly preferable. The average particle size of aluminum oxide crystals is preferably 5 μm or more and 20 μm or less.

When the average particle size of the aluminum oxide crystals is within the range described above, a surface area of a grain boundary phase per unit surface area decreases compared with when the average particle size is less than 5 μm, and thus thermal conductivity improves. On the other hand, compared with when the average particle size exceeds 20 μm, the surface area of the grain boundary phase per unit surface area increases, and the adhesiveness of the metallization layer 12 increases due to the anchor effect of the metallization layer 12 in the grain boundary phase, such that reliability improves and mechanical properties increase.

To measure the particle size of the aluminum oxide crystals, a first polishing step is performed on a copper grinder from a surface of the insulating member 1 in a depth direction using diamond abrasive particles having an average particle size $D_{50}$ of 3 μm. Thereafter, a second polishing step is performed on a tin grinder using diamond abrasive particles having an average particle size $D_{50}$ of 0.5 μm. The depth of polishing including the first polishing step and the second polishing step is, for example, 0.6 mm. A polished surface obtained by the polishing steps is subjected to thermal treatment at 1480° C. until crystal particles and a grain boundary layer are distinguishable, and an observation surface is obtained. The thermal treatment is performed for approximately 30 minutes, for example.

A thermally treated surface is observed under an optical microscope and photographed, for example, at a magnification factor of 400×. In a captured image, a surface area of $4.8747\times10^2$ μm is used as a measuring range. By analyzing the measuring range using image analysis software (e.g., Win ROOF, manufactured by Mitsubishi Corporation), particle sizes of individual crystals can be obtained, and an average particle size of the crystals is an arithmetic average of the particle sizes of the individual crystals.

Here, the kurtosis of the particle size distribution of the aluminum oxide crystals is preferably 0 or more. Accordingly, variations in the particle sizes of the crystals are suppressed and thus localized reduction in mechanical strength is less likely to occur. In particular, the kurtosis of the particle size distribution of the aluminum oxide crystals is preferably 0.1 or more.

"Kurtosis" generally refers to a statistical amount that indicates a degree to which a distribution deviates from the normal distribution, indicating the sharpness of the peak and the spread of the tail. When the kurtosis is less than 0, the peak is gentle and the tail is short. When the kurtosis is larger than 0, the peak is sharp and the tail is long. The kurtosis of a normal distribution is 0. The kurtosis can be determined by the function Kurt provided in Excel (Microsoft Corporation), using the particle sizes of the crystals. To make the kurtosis 0 or more, for example, the kurtosis of the particle size distribution of aluminum oxide powder, which is a raw material, may be set to 0 or more.

Here, "ceramic having aluminum oxide as a main constituent" refers to a ceramic having an aluminum oxide content, with Al converted to $Al_2O_3$, of 90% by mass or more, with respect to all the constituents constituting the ceramic being 100% by mass. Constituents other than the main constituent may include, for example, at least one of silicon oxide, calcium oxide, or magnesium oxide. Here, "ceramic having zirconium oxide as a main constituent" refers to a ceramic having a zirconium oxide content, with Zr converted to $ZrO_2$, of 90% by mass or more, with respect to all the constituents constituting the ceramic being 100% by mass. Examples of the constituents other than the main constituent may include yttrium oxide.

Here, the constituents constituting the ceramic can be identified from measurement results by an X-ray diffractometer using a CuKα beam, and the content of each of the components can be determined, for example, with an inductively coupled plasma (ICP) emission spectrophotometer or a fluorescence X-ray spectrometer.

Dimensions of the insulating member 1 are set to, for example, an outer diameter of 35 mm or more and 45 mm or less, an inner diameter of 25 mm or more and 35 mm or less, and a length in an axial direction of 340 mm or more and 420 mm or less.

When obtaining the insulating member 1 made of the ceramic containing aluminum oxide as the main constituent, an aluminum oxide powder, which is the main constituent, a magnesium hydroxide powder, a silicon oxide powder, a calcium carbonate powder, and, as necessary, a dispersing agent that disperses an alumina powder are ground and mixed in a ball mill, a bead mill, or a vibration mill to form a slurry, and the slurry, after a binder is added and mixed therewith, is spray dried to form granules containing alumina as a main constituent.

To make the kurtosis of the particle size distribution of the aluminum oxide crystals 0 or more, the time for grinding and mixing is adjusted so that the kurtosis of the particle size distribution of the powders is 0 or more.

Here, the average particle size ($D_{50}$) of the aluminum oxide powder is 1.6 μm or more and 2.0 μm or less, and of a total of 100% by mass of the powder, the content of the magnesium hydroxide powder is 0.43 to 0.53% by mass, the content of the silicon oxide powder is 0.039 to 0.041% by mass, and the content of the calcium carbonate powder is 0.020 to 0.022% by mass.

Next, the granules obtained by the method described above are filled into a molding die and a powder compact is obtained using an isostatic press method (rubber press method) or the like with a molding pressure of, for example, 98 MPa or more and 147 Mpa or less.

After molding, pilot holes having a long shape that serve as the plurality of through holes 4 along the axial direction of the insulating member 1 and pilot holes that open end surfaces on both sides along the axial direction of the insulating member 1 are formed by cut processing, so as to make each into a powder compact having a tubular shape.

As necessary, the powder compact formed by cut processing is heated for 10 to 40 hours in a nitrogen atmosphere, is held for 2 to 10 hours at 450° C. to 650° C., and then, with the binder disappearing by natural cooling, turns into a degreased body.

Then, by firing the powder compact (degreased body) in an air atmosphere at a firing temperature of 1500° C. or more and 1800° C. or less and holding at the firing temperature for 4 hours or more and 6 hours or less, an insulating member, which is made of the ceramic containing aluminum oxide as the main constituent and having an average particle size of the aluminum oxide crystals of 5 μm or more and 20 μm or less, can be obtained.

The electromagnetic field control member according to an embodiment of the present disclosure has been described above, but the present disclosure is not limited to the embodiment, and various changes and modifications can be made. For example, direct brazing can be performed instead of using the metallization layer, as necessary.

REFERENCE SIGNS LIST

1 Insulating member
2 Flange
3 Shaft
4 Through hole
5 First power feed terminal
6 Second power feed terminal
7, 8 Line
9 Conductive member
10 Opening portion
11 Space

12 Metallization layer
13A Inclined surface
13B Vertical surface
14, 15 Blade
16 Blade joining member
17, 18 screw insertion hole
19 Gap
20 Groove
21*a*, 21*b* Sleeve
22A Second inclined surface
22B Second vertical surface 100 Electromagnetic field control member

The invention claimed is:

1. An electromagnetic field control member comprising:

an insulating member made of a ceramic having a tubular shape, the insulating member comprising a plurality of through holes extending in an axial direction;

a conductive member made of a metal, the conductive member sealing off each through hole of the plurality of through holes and leaving an opening portion in the through hole, the opening portion opening to an outer periphery of the insulating member; and a power feed terminal connected to the conductive member, wherein the each through hole of the plurality of through holes comprises inner wall surfaces, inner wall surfaces further comprising: inclined surfaces for which a width between inner walls of the inclined surfaces facing each other gradually increases from an inner periphery of the insulating member to the outer periphery of the insulating member; and vertical surfaces located on an inner peripheral side of the insulating member and for which a width between inner walls of the vertical surfaces facing each other is constant.

2. The electromagnetic field control member according to claim 1, wherein a volume between the inclined surfaces facing each other is larger than a volume between the vertical surfaces facing each other.

3. The electromagnetic field control member according to claim 1, wherein the inclined surfaces and the vertical surfaces are continuous.

4. The electromagnetic field control member according to claim 1, wherein the conductive member is disposed at a site in the each through hole where the vertical surfaces are located, and seals off the through hole.

5. The electromagnetic field control member according to claim 1, wherein a metallization layer or plating layer is formed on the inner wall surfaces of the each through hole of the plurality of through holes, and the metallization layer or plating layer and a side surface of the conductive member are hermetically fixed.

6. The electromagnetic field control member according to claim 1, wherein the conductive member comprises a groove in which the power feed terminal is mounted in a thickness direction, and both end surfaces of the groove are curved surfaces extending in the axial direction in a plan view.

7. The electromagnetic field control member according to claim 1, wherein an outer peripheral side of each end portion of two end portions of the insulating member comprises a flat surface on an extension line in an axial direction of the through holes.

8. The electromagnetic field control member according to claim 1, wherein the ceramic of the insulating member contains aluminum oxide as a main constituent, and an average particle size of aluminum oxide crystals of the aluminum oxide is 5 μm or more and 20 μm or less.

9. The electromagnetic field control member according to claim 8, wherein a kurtosis of particle size distribution of the aluminum oxide crystals is 0 or more.

* * * * *